US006578117B2

(12) United States Patent
Weber

(10) Patent No.: US 6,578,117 B2
(45) Date of Patent: Jun. 10, 2003

(54) METHOD AND APPARATUS FOR SCHEDULING REQUESTS USING ORDERED STAGES OF SCHEDULING CRITERIA

(75) Inventor: Wolf-Dietrich Weber, San Jose, CA (US)

(73) Assignee: Sonics, Inc., Mountain View, CA (US)

( * ) Notice: Subject to any disclaimer, the term of this patent is extended or adjusted under 35 U.S.C. 154(b) by 0 days.

(21) Appl. No.: 09/977,517

(22) Filed: Oct. 12, 2001

(65) Prior Publication Data

US 2003/0074520 A1 Apr. 17, 2003

(51) Int. Cl.$^7$ ............................................... G06F 13/18
(52) U.S. Cl. ....................................................... 711/151
(58) Field of Search .............................. 711/105, 151, 711/158, 167, 168; 709/102, 103

(56) References Cited

U.S. PATENT DOCUMENTS

| | | |
|---|---|---|
| 5,218,456 A | 6/1993 | Stegbauer et al. |
| 5,274,769 A | 12/1993 | Ishida ............................ 710/31 |
| 5,287,464 A | 2/1994 | Kumar et al. .................. 64/229 |
| 5,363,484 A | 11/1994 | Desnoyers et al. ............. 709/24 |
| 5,469,473 A | 11/1995 | McClear et al. ............. 375/219 |
| 5,530,901 A | 6/1996 | Nitta ............................. 710/28 |
| 5,557,754 A | 9/1996 | Sone et al. .................. 710/107 |
| 5,664,153 A | 9/1997 | Farrell ......................... 711/154 |
| 5,809,538 A | 9/1998 | Pollmann et al. |
| 5,926,649 A | * 7/1999 | Ma et al. ....................... 710/6 |
| 5,982,780 A | 11/1999 | Bohm et al. |
| 5,996,037 A | 11/1999 | Emnett |
| 6,023,720 A | * 2/2000 | Aref et al. ................... 709/103 |
| 6,092,137 A | 7/2000 | Huang et al. |
| 6,104,690 A | * 8/2000 | Feldman et al. ............. 369/103 |
| 6,122,690 A | 9/2000 | Nannetti et al. ............. 710/102 |
| 6,167,445 A | * 12/2000 | Gai et al. ..................... 709/220 |
| 6,253,269 B1 | 6/2001 | Cranston et al. ............ 710/107 |
| 6,330,225 B1 | * 12/2001 | Weber et al. ................ 370/231 |
| 6,335,932 B2 | 1/2002 | Kadambi et al. |
| 6,363,445 B1 | 3/2002 | Jeddeloh |

OTHER PUBLICATIONS

Rixner, Scott, Et Al., Memory Access Scheduling, To appear in ISCA–27 (2000), Computer Systems Laboratory, Stanford University, Stanford, CA 94305, pp. 1–11.
Search Report for PCT/US02/05439, mailed Jun. 26, 2002, 1 page.
Search Report for PCT/US02/05287, mailed Jul. 11, 2002, 2 pages.
Lamport, Leslie; How to Make a Multiprocessor Computer That Correctly Executes Multiprocess Programs, IEEE Transactions On Computers, vol. C–28, No. 9, Sep. 1979, pp. 690–691.
Search Report for PCT/US02/05288; mailed May 20, 2002; 1 page.
Search Report for PCT/US02/05438; mailed May 24, 2002; 1 page.
Rixner et al., "A Bandwidth–Efficient Architecture for Media Processing", Micro–31, 1998, pp. 1–11.

\* cited by examiner

*Primary Examiner*—Kevin L. Ellis
(74) *Attorney, Agent, or Firm*—Blakely, Sokoloff, Taylor & Zafman LLP

(57) ABSTRACT

The present invention provides for the scheduling of requests to one resource from a plurality of initiator devices. In one embodiment, scheduling of requests within threads and scheduling of initiator device access is performed wherein requests are only reordered between threads.

9 Claims, 5 Drawing Sheets

METHOD AND APPARATUS FOR SCHEDULING REQUESTS USING ORDERED STAGES OF SCHEDULING CRITERIA

FIELD OF THE INVENTION

The mechanism described herein applies to systems where multiple independent initiators are sharing a dynamic random access memory (DRAM) subsystem.

BACKGROUND

In systems that are built on a single chip it is not uncommon that there are several independent initiators (such as microprocessors, signal processors, etc.) accessing a dynamic random access memory (DRAM) subsystem that for cost, board area, and power reasons is shared among these initiators. The system may require different qualities of service (QOS) to be delivered for each of the initiators. Secondly, the memory ordering model presented to the initiators is important. Ideally, the initiators want to use a memory model that is as strongly ordered as possible. At the same time, the order in which DRAM requests are presented to the DRAM subsystem can have a dramatic effect on DRAM performance. Yet re-ordering of requests for thread QOS or DRAM efficiency reasons can compromise a strongly ordered memory model. What is required is a unified DRAM scheduling mechanism that presents a strongly ordered memory model, gives differential quality of service to different initiators, and keeps DRAM efficiency as high as possible.

The request stream from each different initiator can be described as a thread. If a DRAM scheduler does not re-order requests from the same thread, intra-thread request order is maintained, and the overall DRAM request order is simply an interleaving of the sequential per-thread request streams. This is the definition of Sequential Consistency, the strongest memory ordering model available for systems that include multiple initiator components. (For further discussion regarding Sequential Consistency, see Leslie Lamport, *How to Make a Multiprocessor Computer That Correctly Executes Multiprocess Programs,* IEEE Transactions On Computers, Vol. C-28, No. 9, September 1979, pgs. 690–691.)

Existing systems either order the requests at a different point in the system than where the DRAM efficiency scheduling occurs (if any is done), and/or the systems re-order requests within a processing thread. For example, requests may be carried from the initiators to the DRAM Controller via a standard computer bus. Request order (between threads and within threads) is established at the time of access to the computer bus, and is not allowed to be changed by the DRAM controller. In this case, DRAM scheduling for efficiency is more constrained than it needs to be resulting in lower DRAM efficiency. In a different example, each initiator may have its own individual interface with the DRAM Controller, allowing the DRAM controller to schedule requests while maintaining thread ordering. This kind of system has the potential of achieving sufficient results, but it is wasteful of wires to the DRAM controller. It is possible, in such a system, to reorder DRAM requests within a thread. While this may result in higher DRAM efficiency, it also considerably loosens the memory model, i.e. it no longer presents a memory model of Sequential Consistency. It is important to retain a strong memory model while at the same time allowing a reordering of memory requests to achieve a high DRAM efficiency and QOS guarantees.

SUMMARY OF THE INVENTION

The present invention provides for the scheduling of requests to one resource, such as a DRAM subsystem, from a plurality of initiators. Each initiating thread is provided different quality-of-service while resource utilization is kept high and a strong ordering model is maintained.

DETAILED DESCRIPTION

The mechanism described herein applies to systems where multiple independent initiators share a dynamic random access memory (DRAM) subsystem.

In one embodiment, the present invention allows different initiators to be given a pre-defined quality of service independent of one another while at the same time keeping DRAM efficiency as high as possible and presenting a strong memory ordering model to the initiators.

Figure 1:
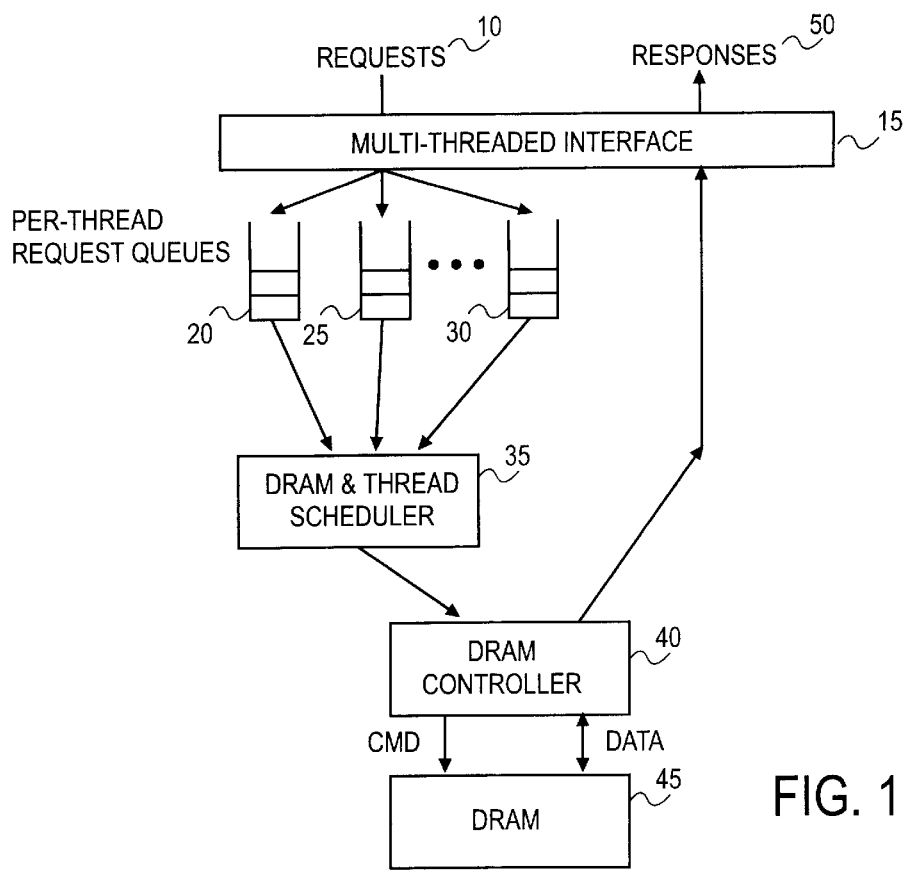
FIG. 1 illustrates one embodiment of the system of the present invention.

FIG. 1 shows a high-level block diagram of one embodiment of a DRAM scheduling system. Requests 10 from different initiators arrive over a multi-threaded interface 15. An initiator may be embodied as a device or a process. Requests 10 from different initiators are communicated across different threads that are identified by different thread identifiers ("thread IDs") at the interface. This allows requests to be split by thread (or initiator) into per-thread request queues, e.g. 20, 25, 30. Requests from these thread queues 20, 25, 30 are presented in parallel to the DRAM and thread scheduler block 35. The scheduler block 35 decides the order in which requests are presented to the DRAM Controller 40, which in turn is responsible for sending the requests to the actual DRAM subsystem 45. When responses 50 return from the DRAM controller 45, they are sent back to the initiators via the multi-threaded interface 15. The delivery of requests from the initiators was described using a multi-threaded interface and thread identifiers. An alternative embodiment uses individual single-threaded interfaces for each initiator.

The DRAM and Thread scheduler 35 acts as the synchronization point that establishes the order in which DRAM requests are processed. Even though requests can arrive over the multi-threaded interface in one order, the requests may be re-ordered by the scheduler block 35 in order to satisfy thread quality of service (QOS) guarantees, or in order to increase DRAM efficiency. Conversely, the DRAM Controller 40 block processes requests in order, so that the order established by the scheduler block 35 is indeed the order in which requests are committed. However, if the scheduler block 35 does not re-order requests from the same thread, intra-thread request order is maintained, and the overall DRAM request order is simply an interleaving of the sequential perthread request streams.

Figure 2:
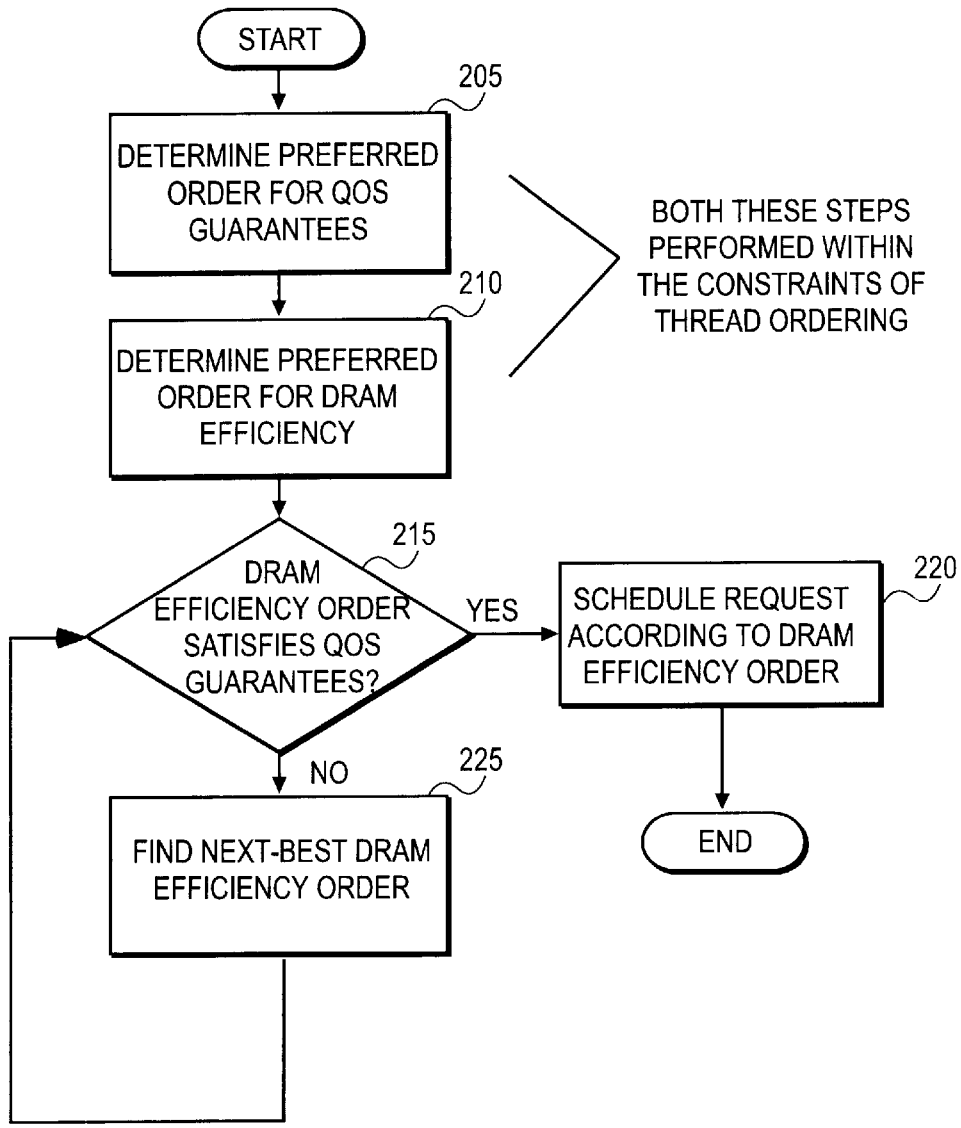
FIG. 2 is a simplified flow diagram illustrating one embodiment of combining thread scheduling and device scheduling.

One embodiment of the process is illustrated by the simplified flow diagram of FIG. 2. At step 205, a preferred request order for QOS guarantees is identified or determined. The preferred order for processing requests for DRAM efficiency is determined at step 210. In performing steps 205 and 210 the constraints of the memory ordering model are taken into account. If the preferred DRAM efficiency order satisfies QOS guarantees, step 215, then a request is scheduled according to the DRAM efficiency order, step 220. If the DRAM efficiency order does not satisfy QOS guarantees, step 215, the next-best DRAM efficiency order is determined, step 225. This step is repeated until the DRAM efficiency order meets QOS guarantees.

The process illustrated by FIG. 2 is only one embodiment. Other embodiments are also contemplated. For example, in one embodiment, a request order is determined that satisfies QOS guarantees and is then modified to optimize DRAM efficiency.

Figure 3:
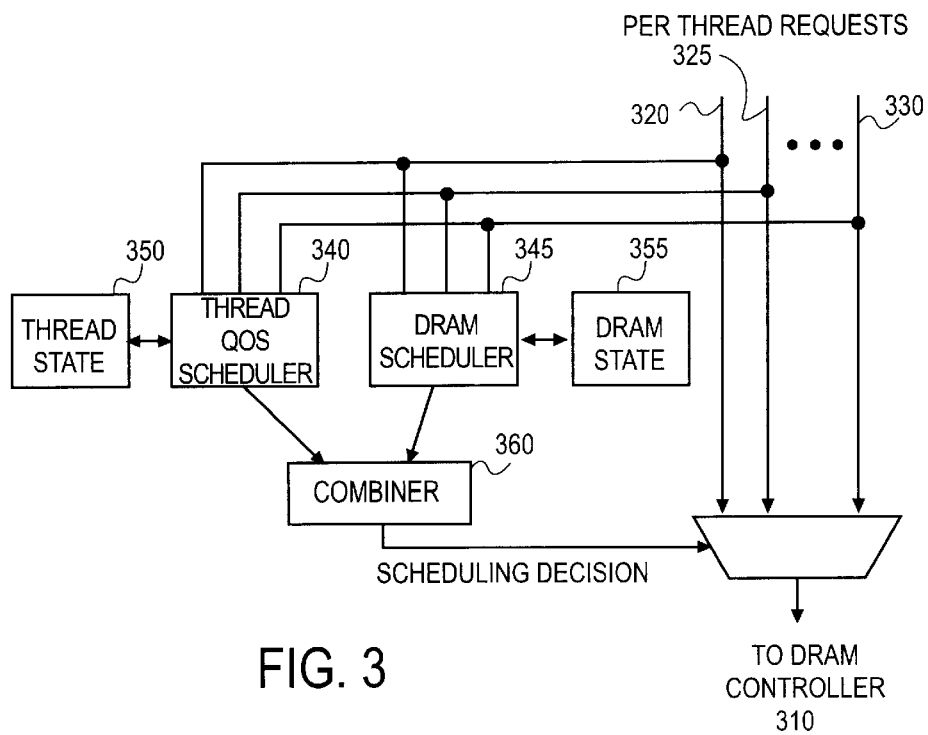
FIG. 3 illustrates one embodiment of a DRAM and thread scheduler.

FIG. 3 offers a more detailed look at one embodiment of the DRAM and Thread Scheduler of FIG. 1. The requests 320, 325, 330 from different threads are presented and sequenced to the DRAM controller 310. The scheduling decision for which request gets to proceed at any one time is derived using a combination of thread quality of service scheduling and DRAM scheduling.

The thread quality of service scheduler 340 keeps and uses thread state 350 to remember thread scheduling history and help it determine which thread should go next. For example, if threads are being guaranteed a certain amount of DRAM bandwidth, the thread scheduler 340 keeps track of which thread has used how much bandwidth and prioritizes threads accordingly. The DRAM scheduler 345, on the other hand, attempts to sequence requests from different threads so as to maximize DRAM performance. For example, the scheduler 345 might attempt to schedule requests that access the same DRAM page close to each other so as to increase the chance of getting DRAM page hits. The DRAM scheduler 345 uses and keeps state 355 on the DRAM and access history to help with its scheduling decisions.

The thread quality of service scheduler 340 and the DRAM scheduler 345 are optimized for different behavior and may come up with conflicting schedules. Outputs of the two schedulers 340, 345 have to be combined 360 or reconciled in order to achieve the promised thread quality of service while still achieving a high DRAM efficiency.

The DRAM scheduler 345 itself has to balance several different scheduling goals. In one embodiment, scheduling components can be categorized into two broad categories, referred to herein as absolute and cost-function scheduling.

Absolute scheduling refers to scheduling where a simple yes/no decision can be made about every individual request. An example is DRAM bank scheduling. Any given DRAM request has exactly one bank that it addresses. Either that bank is currently available to receive the request, or it is busy with other requests and there is no value in sending the request to DRAM at this time.

Cost-function scheduling is more subtle, in that there is no immediate yes/no answer to every request. At best it can be said that sending the request to DRAM at a certain time is more or less likely to yield a high DRAM efficiency.

Figure 4:
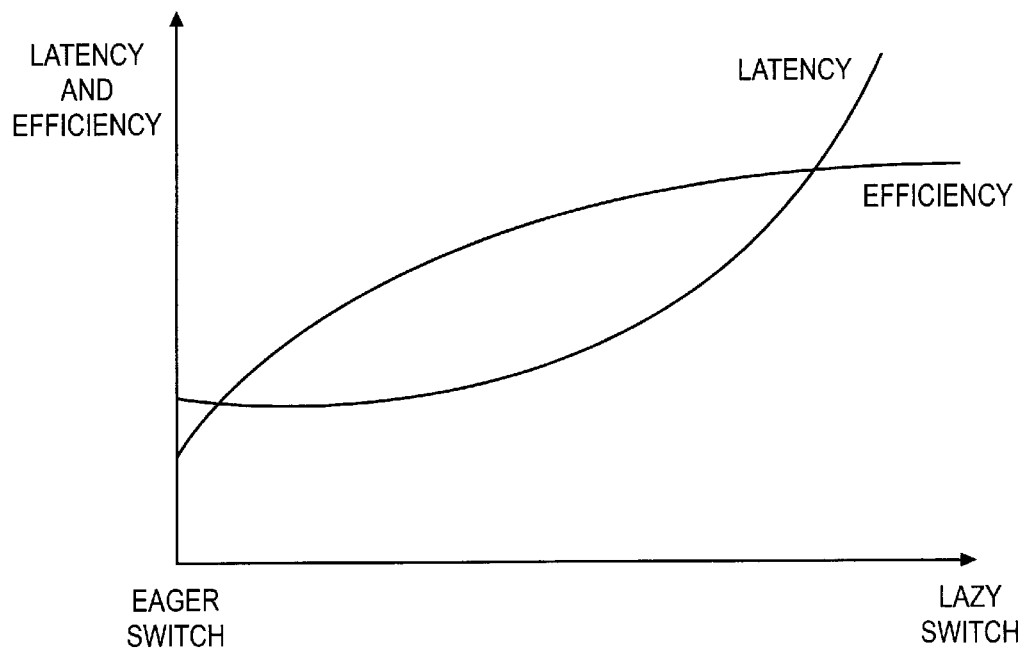
FIG. 4 is a simplified example illustrating the tradeoff of cost function scheduling.

An example of cost function scheduling is request scheduling based on the direction of a shared DRAM data bus. Typically, there is a cost associated with changing the DRAM data bus direction from read to write and vice versa. It is thus advantageous to collect requests that require the same data bus direction together rather than switching between every request. How many requests should be collected together depends on the expected request input pattern and a trade-off between efficiency and latency, an example of which is illustrated in FIG. 4. If the DRAM scheduling algorithm is set to switch frequently between directions, the expected efficiency is low because a lot of switches result in many wasted data bus cycles. On the other hand, the average waiting time (latency) of a request is low because it gets serviced as soon as it arrives.

If the DRAM scheduling algorithm is set to switch less frequently (i.e. to collect more requests of each direction together) the overall DRAM efficiency is likely to be higher but the average latency of requests is also higher. The best point for overall system performance is not easily determined and depends on the request pattern, the trade-off between latency and efficiency, and the cost of switching.

The example below uses bus direction as the basis for cost-function scheduling. However, it is contemplated that a variety of other criteria may be used to implement cost-function scheduling. Other examples of cost-function scheduling include deciding when to close one DRAM page and open another and deciding when to switch DRAM requests to use a different physical bank.

Figure 5:
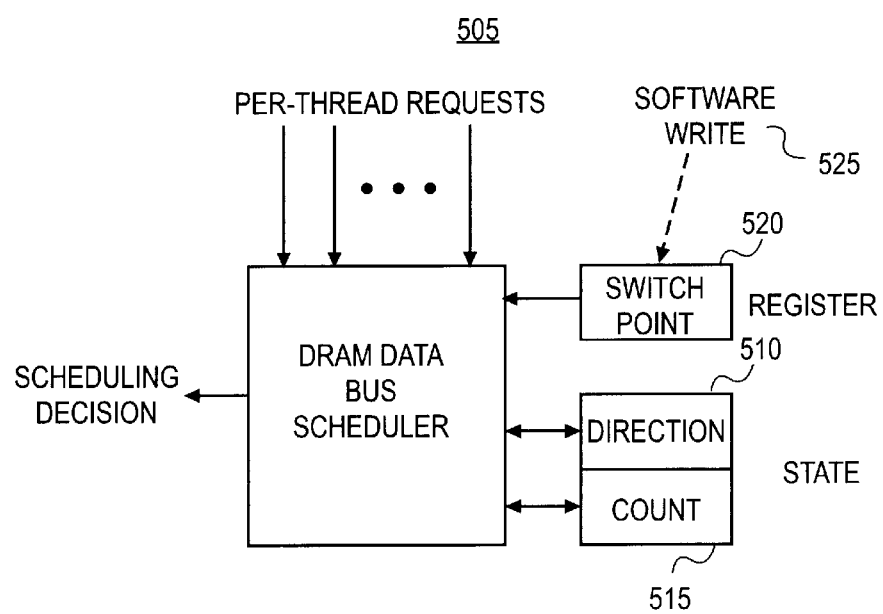
FIG. 5 illustrates one embodiment of a cost function DRAM bus scheduler.

FIG. 5 illustrates one embodiment of a DRAM bus scheduler that is programmable so as to allow dynamic adjustment of the switch point for optimum performance. In one embodiment, the scheduler 505 keeps track of the last direction (read or write) of the data bus 510, and a count 515 of the number of requests that had that direction. A register 520 is added to hold the switch point information. In one embodiment, this register 520 can be written from software 525 while the system is running in order to dynamically configure the DRAM scheduler for optimum performance. For example, it may be desirable to update the switch point dynamically according to the application and/or by the application. In one embodiment, the switchpoint is empirically determined based upon past and possibly current performance.

As requests are presented on the different threads, the scheduler 505 looks at the current direction of the DRAM data bus, the count of requests that have already been sent, the configurable switch point, and the direction of incoming new requests. Before the count reaches the switch point, requests that have the same direction as the current DRAM data bus are preferred over those going in the opposite direction. Once the switch point is reached, requests to the opposite direction are preferred. If only requests from one direction are presented, there is no choice in which direction the next request will go. In the present embodiment, a count and compare function is used to determine the switch point. However, it is contemplated that other functions may be used. Furthermore, although the example herein applies the count and compare function to bus direction, all types of measures for the count may be used.

Figure 6:
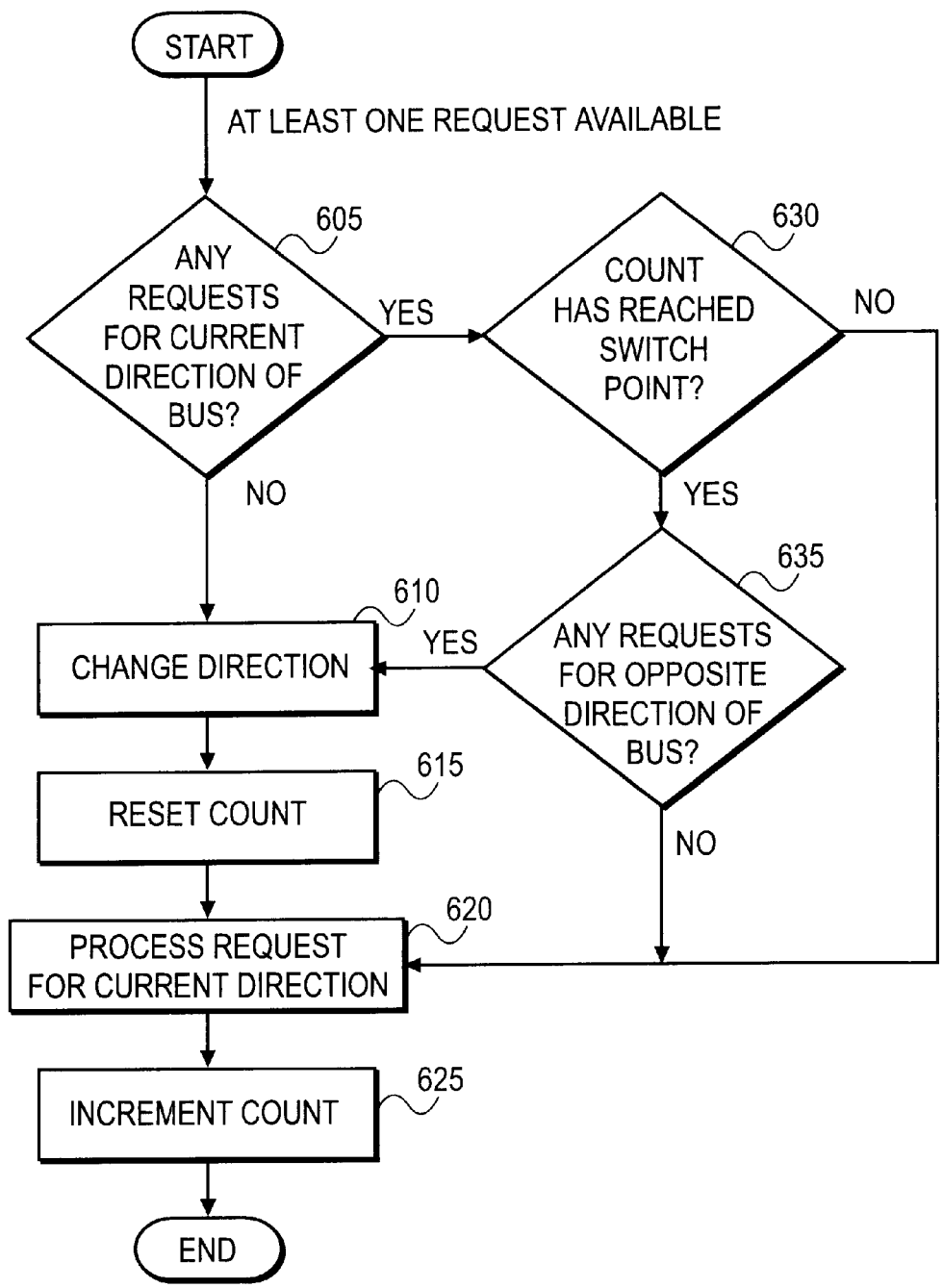
FIG. 6 is a flow diagram illustrating one embodiment of a cost function DRAM bus scheduling process.

One embodiment of the process is illustrated by FIG. 6. At step, 605, considering that at least one request is available, it is determined whether there are any requests for the current direction of the bus. If there are not, the bus direction is changed, step 610, the count resets step 615, and the request is processed using the new direction of the bus 620.

The count keeping track of the number of requests performed in the current bus direction is incremented, step 625. If there are requests for the current direction of the bus, it is then checked to see if the count has reached the switch point, step 630. If the switch point has been reached then it is determined whether there are any requests for the opposite direction of the bus, step 635. If there are not, then the request for the current direction is processed, step 620, and the count incremented, step 625. In addition, if the count has not reached the switch point, step 630, then the process continues with the request for the current direction being processed and the count being incremented, steps 620 and 625.

Figure 7:
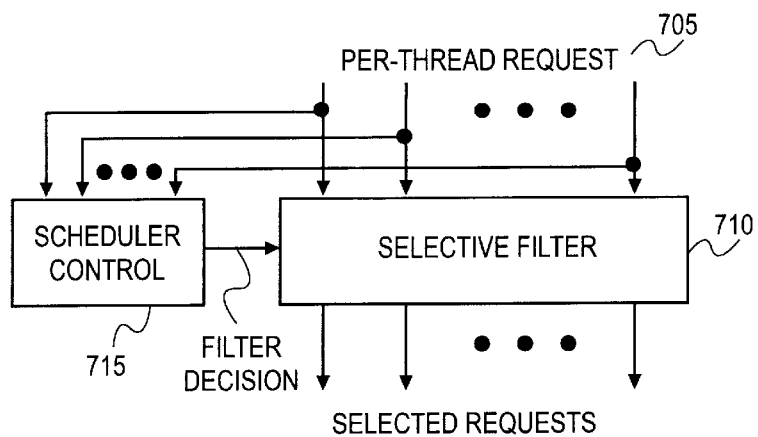
FIG. 7 illustrates one embodiment of a scheduling component as a request filter.

It is desirable, in one embodiment, to combine thread quality of service scheduling and DRAM scheduling to achieve a scheduling result that retains the desired quality of service for each thread while maximizing DRAM efficiency. One method for combining the different scheduling components is to express them as one or more request filters, one of which is shown in FIG. 7. Per-thread requests 705 enter, and are selectively filtered, so that only a subset of the requests filters through, i.e. exits, the filter 710. The decision of which requests should be filtered out is made by the control unit 715 attached to the filter. The unit 715 bases its decision on the incoming requests and possibly some state of the unit 715. For example, for a cost function filter that decides to switch the direction of the DRAM data bus, the decision is based on the current direction of the bus, the number of requests that have already passed in that direction since the last switch and the types of requests being presented from the different threads. The decision might be to continue with the same direction of the DRAM data bus, and so any requests that are for the opposite direction are filtered out.

Once the different scheduling components have been expressed as filters, the various filters can be stacked to combine the scheduling components. The order of stacking the filters determines the priority given to the different scheduling components.

Figure 8:
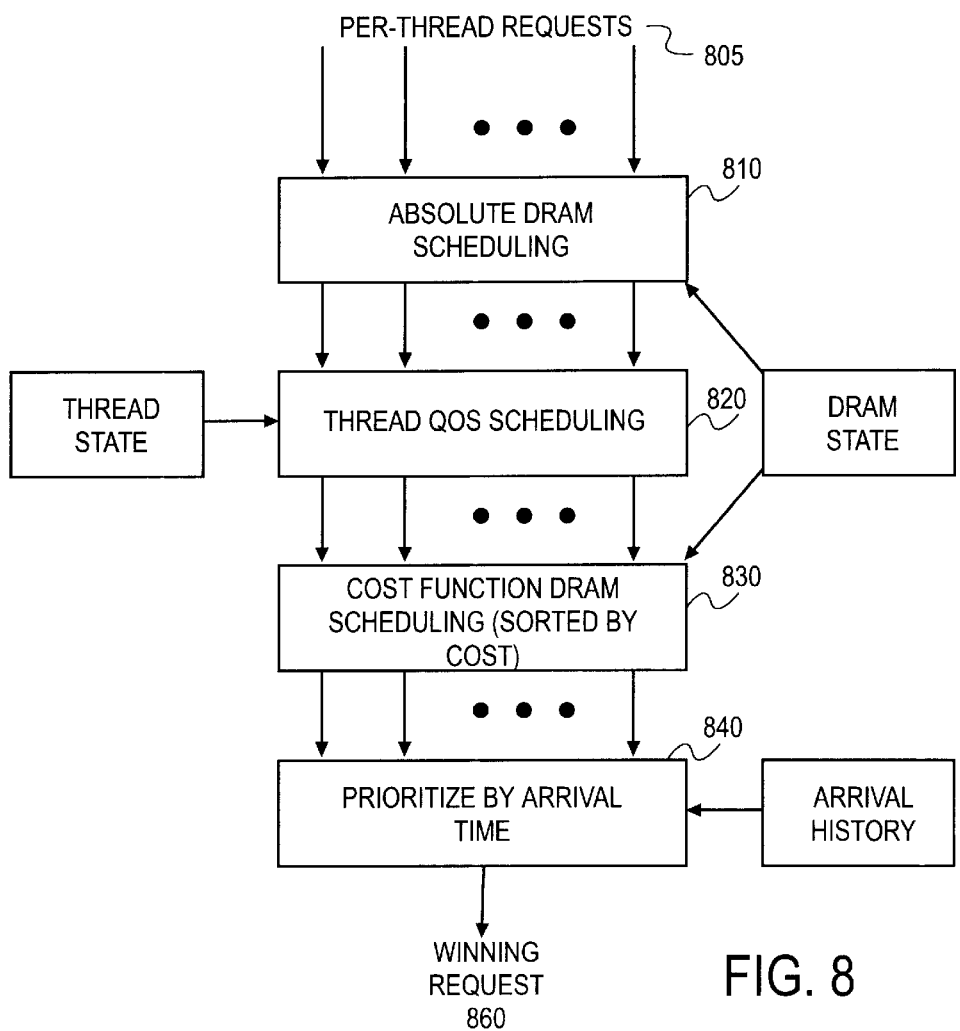
FIG. 8 illustrates one embodiment of ordering of thread scheduling and device scheduling to achieve the desired results.

FIG. 8 is a block diagram of one embodiment illustrating the ordering of the different portions of the two scheduling algorithms to achieve the desired results. Each of the blocks 810, 820, 830, 840 shown in FIG. 8 acts like a filter for requests entering 805 and emerging 860. For each filter, for example, 810, 820, 830 only requests that meet the criteria of that stage of scheduling are allowed to pass through. For example, DRAM bank scheduling 810 allows only requests to available banks to pass through and filters out those requests that do not meet the criteria. Thread quality of service scheduling 820 allows only threads that are in the desired priority groups to pass through. Data bus scheduling, an example of cost-function scheduling, 830 might preferentially allow only reads or writes to pass through to avoid data bus turnaround.

More particularly, in one embodiment, DRAM requests 805 from different threads enter and the absolute DRAM scheduling components 810 are exercised, so that requests that cannot be sent to DRAM are filtered out, and only requests that can be sent continue on to the thread scheduler 820. The thread scheduler 820 schedules requests using the quality of service requirements for each thread. The scheduler 820 filters out requests from threads that should not receive service at this time. Any remaining requests are passed on to the cost-function DRAM scheduler 830. Here, requests are removed according to cost-function scheduling. If there is more than one cost-function component to DRAM scheduling, the different components are ordered from highest switch cost to lowest. For example, if data bus turnaround costs 3 cycles and switching from one physical DRAM bank to another costs 1 cycle, then DRAM data bus scheduling is placed ahead of physical bank scheduling. If more than one request emerges from the bottom of the cost-function DRAM scheduler, they are priority ordered by arrival time. This last filter 840 prevents requests from getting starved within their thread priority group.

It is readily apparent that the above is just one implementation of a DRAM scheduling system. It is readily recognized that different filter types, having different thresholds, and switch points and/or different ordering of filters can be implemented to achieve desired results. Furthermore, although represented in the drawings as separate filter elements, the filters may be implemented by a single logic processor or process that performs the stages of the process representative of the filtering functions described above. The invention has been described in conjunction with one embodiment. It is evident that numerous alternatives, modifications, variations and uses will be apparent to those skilled in the art in light of the foregoing description.

What is claimed is:

1. A method for scheduling access to a resource comprising combining quality of service (QOS) scheduling for processing request threads, that maintains QOS for each thread, and resource scheduling, that maximizes resource efficiency, wherein the resource is a dynamic random access memory (DRAM) and the stages are ordered to determine an order of requests to meet QOS guarantees and determine an order of requests for DRAM efficiency, wherein if the DRAM efficiency order satisfies QOS guarantees, a request is scheduled according to a first DRAM efficiency order, else a request is scheduled in accordance with a second DRAM efficiency order.

2. A method for scheduling access to a resource comprising:
   combining quality of service (QOS) scheduling for processing request threads, that maintains QOS for each thread, and resource scheduling, that maximizes resource efficiency, wherein combining comprises filtering requests in determined stages each stage reflecting one of a QOS and resource scheduling criteria, and ordering the stages to achieve a determined combined QOS and resource schedule or priority of requests, wherein said filtering comprises,
   filtering through requests that can be sent due to availability of the resource;
   filtering through requests that meet QOS guarantees;
   filtering through requests according to cost-function scheduling of the resource; and
   providing the filtered requests for processing by the resource.

3. The method as set forth in claim 2, wherein the step of filtering through requests according to cost-function scheduling of the resource comprising filtering ordered from highest switch cost to lowest.

4. The method as set forth in claim 2, wherein if providing comprises a plurality of requests, the method further comprising priority ordering the requests for scheduling according to arrival time.

5. The method as set forth in claim 2, wherein the resource is a dynamic random access memory (DRAM).

6. A scheduling apparatus for scheduling access to a device comprising:
   a combined quality of service (QOS) and resource scheduler for processing request threads, wherein QOS for each thread is maintained, wherein resource efficiency is maximized, wherein the combined QOS and resource scheduler comprises, a plurality of request filters, each request filter to reflect one of a plurality of QOS and resource scheduling criteria, the request filters being ordered to determine a priority of each request filter, the request filters comprising, a first request filter to filter requests that cannot be sent due to unavailability of a resource;

a second request filter to receive a first set of filtered requests from the first request filter, the second request filter to filter requests according to QOS guarantees; and a third request filter to receive a second set of filtered requests from the second request filter, the third request filter to filter requests according to cost-function scheduling of the resource and to provide a third set of filtered requests to be processed by the resource.

7. The scheduling apparatus as set forth in claim 6, wherein the resource comprises a dynamic random access memory (DRAM).

8. The scheduling apparatus as set forth in claim 6, wherein said third request filter comprises a plurality of sub-filters ordered from highest to lowest switch cost.

9. The scheduling apparatus as set forth in claim 6, wherein if the third filter provides a third set of requests, the requests of the third set are priority ordered according to arrival time for scheduling.

* * * * *